March 28, 1950 D. E. PAINTING ET AL 2,502,170
FEED MIXER
Filed Aug. 6, 1948 2 Sheets-Sheet 1

Inventors
Delmar E. Painting and
Fred A. Farnbach
by Scott L. Norviel
Attorney

March 28, 1950   D. E. PAINTING ET AL   2,502,170
FEED MIXER
Filed Aug. 6, 1948   2 Sheets-Sheet 2
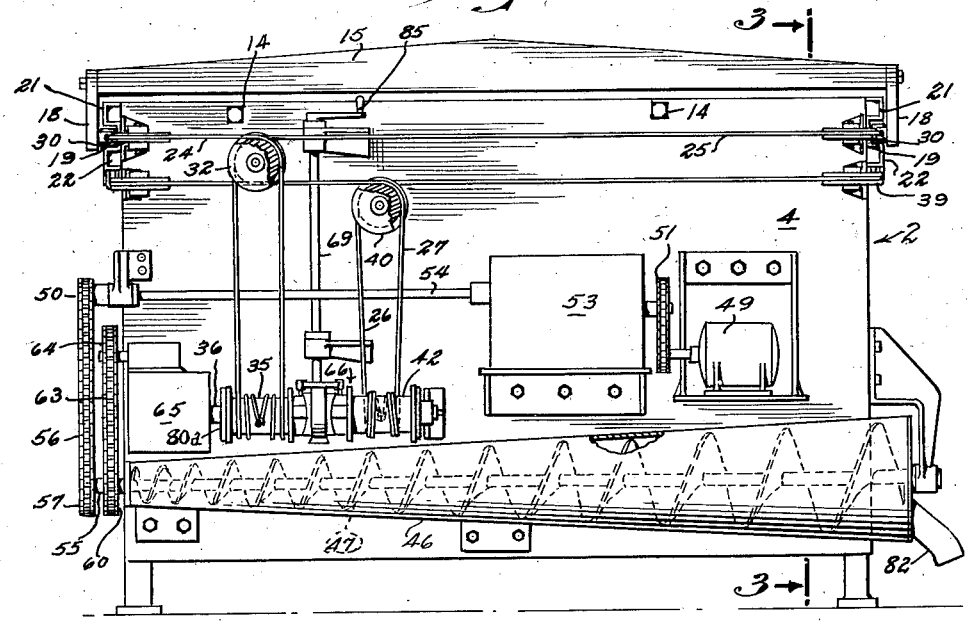
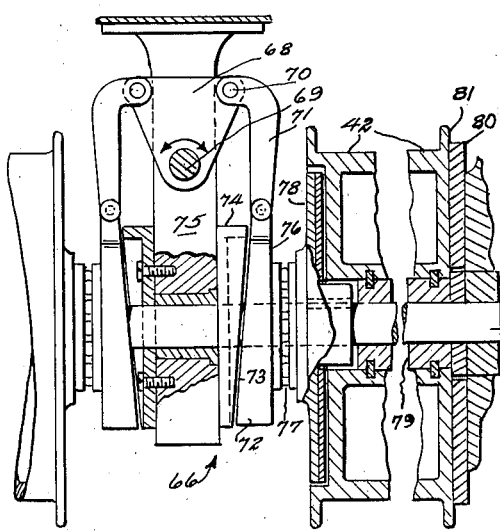
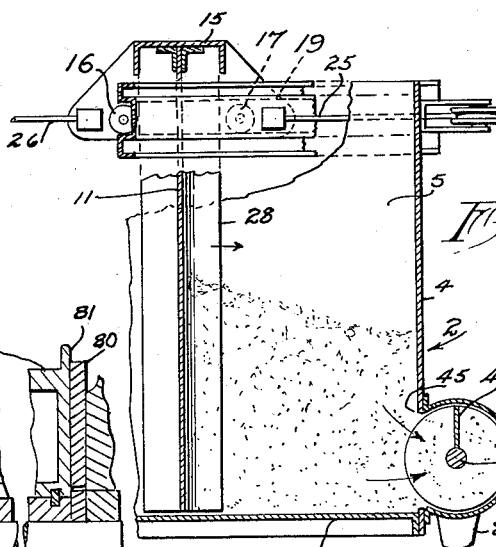
Inventors
Delmar E. Painting and
Fred A. Farnbach
by Scott L. Norvid
Attorney Patented Mar. 28, 1950

2,502,170

UNITED STATES PATENT OFFICE 2,502,170

FEED MIXER

Delmar E. Painting and Fred A. Farnbach, Phoenix, Ariz.; said Farnbach assignor to said Painting Application August 6, 1948, Serial No. 42,766

2 Claims. (Cl. 259—25)

This invention pertains to feed mixers for cattle feed, or the like.

One of the objects is to provide a mixer which will hold a substantial quantity of feed but which is so constructed that it can be mounted on a truck or trailer body and rendered portable;

Another object is to provide a mixer in which predetermined quantities of the various ingredients to be mixed are mechanically forced into a mixing mechanism regardless of their respective weights;

Another object is to provide a feed mixer in which desired quantities of feed are forced into a mixing device at a uniform predetermined rate regardless of the quantity of the ingredients in or remaining in several compartments holding the ingredients.

A further object is to provide a mixer in which the capacities of several bins, holding various ingredients to be mixed can be easily varied;

A still further object is to provide a mixer in which the mixing element is arranged so that a uniform mixing action is progressively maintained as additional quantities of ingredients are added, and so that mixing action can be stopped when desired, while remaining ingredients remain separated and unmixed until operation is resumed.

Other objects will appear hereinafter.

We attain the foregoing objects by means of the structure and arrangement of parts shown in the accompanying drawings, in which—

Figure 2 is an elevational view of the delivery end of the device;

Figure 3 is a partial vertical section taken on line 3—3, Figure 2; and

Figure 4 is a plan view of the partition operative clutch and drive mechanism, drawn on an enlarged scale.

Similar numerals refer to similar parts in the several views.

Figure 1:
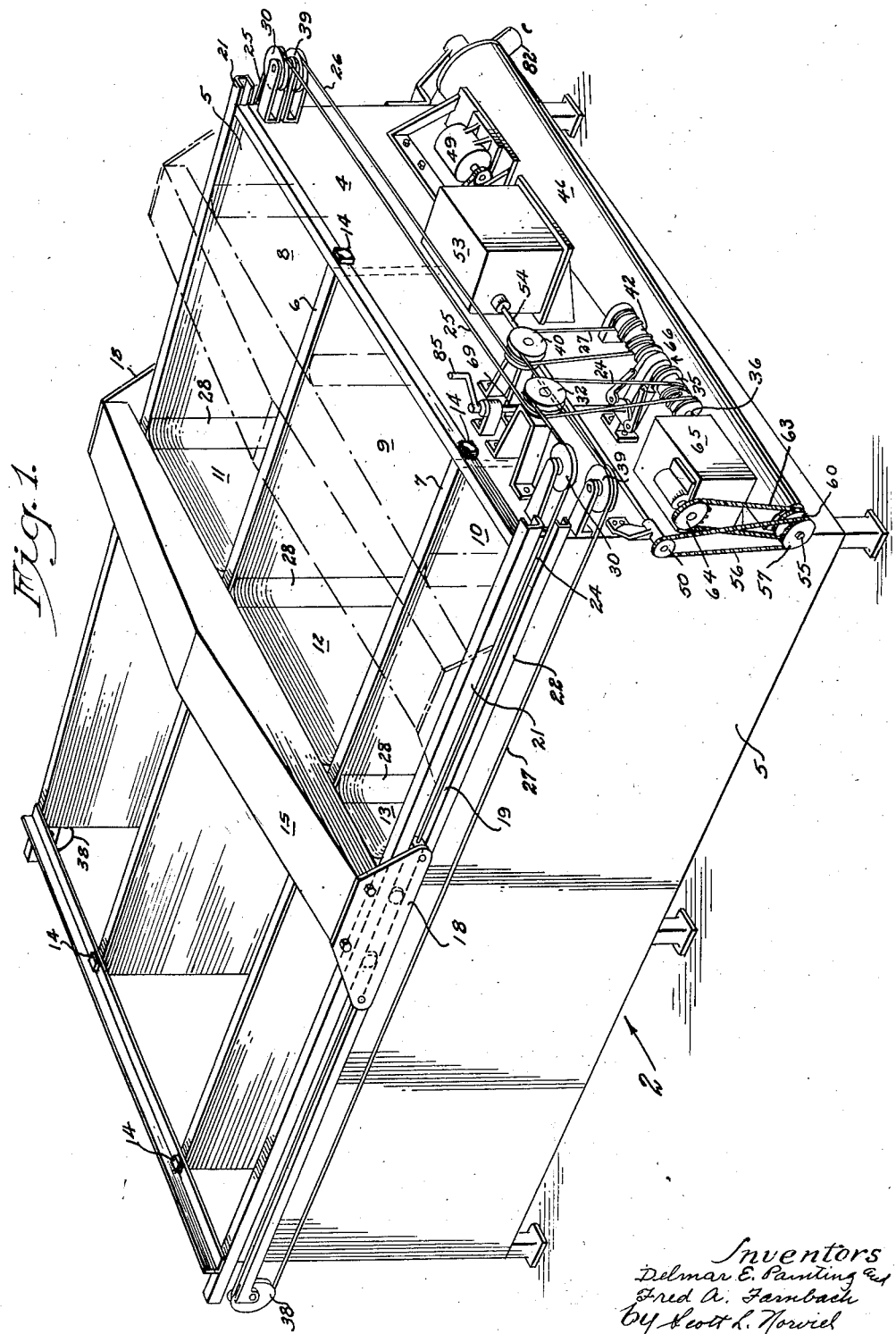
Figure 1 is a perspective view of a feed mixer embodying our improvements.

The body of a rectangular bin is indicated by numeral 2. It has an open top, an open rear end, and a closed bottom 3, a stationary front end wall 4, and sides 5.

Removable partition plates 6 and 7 divide the bin into parallel longitudinally extending partition bins 8, 9, and 10 for holding various types of feed to be mixed. These partition plates are held in position, in the form shown by lag screws 14. It is contemplated, however, that any other equivalent means of attachment may be used, and the partitions placed at any desired positions between side walls 5. When these changes are made, the back walls are, accordingly, proportioned to fit between the partitions and bin sides. The back walls 11, 12, and 13, of each of these partition bins are movable toward and from the front end wall 4.

To make these back walls movable, they are attached to a movable bridge 15, from which they depend. The ends of this bridge are provided with end housing plates 18 on which rollers 16 and 17 are journalled. These rollers run in track 19 formed between longitudinal parallel beams 21 and 22 secured to the upper edges of each of the bin sides 5. This track confines the rollers against up and down movement and thus the bridge is kept from twisting movement as the back walls are moved forward in the bin compartments. The inner faces of the housings 18 confine the bridge against lateral displacement. Flaps 28 of leather or rubber are attached to the sides of back walls 11, 12, and 13 to act as scrapers against the contiguous surfaces of the partitions and bin sides and to prevent leakage of fine feed substances.

The bridge, together with back walls 11, 12, and 13, is mechanically operated longitudinally on the bin body 2 by cables 24 and 25 to draw it toward end 4, while cables 26 and 27 give it a return movement.

Cables 24 and 25 are connected to the front ends of each of the housings 18, and run thence forward over sheaves 30 positioned on wall 4 near its side edges; thence downward over sheaves 32 to drum 35 on shaft 36.

Cables 26 and 27 are attached to the rear ends of each of said housings 18 and extend rearward over sheaves 38, thence forward over sheaves 39 on wall 4 and thence downward over sheaves 40 to drum 42 around which they are wound in a direction opposite to that of cables 24 and 25 on drum 35.

The lower portion of front wall 4 is cut to form an opening 45 over which the conical casing 46, which houses the spiral feed and mixing screw 47. It is to be understood that this housing has a longitudinal opening mating opening 45 in wall 4. Screw 47 acts both as a conveyer and a mixer. Its periphery conforms closely to the interior face of casing 46.

Motor 49 drives sprocket 50 through chain 51, gear box 53 and shaft 54. Sprocket 50 drives the hub shaft 55 of screw 47 through chain 56 and sprocket 57. A sprocket 60 on shaft 55 drives shaft 36 supporting drums 35 and 42 through chain 63, sprocket 64 and gear box 65.

Drums 35 and 42 are journalled on shaft 36 and are driven by the alternately selective clutch indicated generally by numeral 66, and shown in detail in Figure 4.

In this figure, a triangular-shaped crank plate 68 is shown keyed to vertical shaft 69. A pin 70 at the back of this plate connects to link 71 which operates wedge 72. This wedge straddles shaft 36 and the inner angular face 73 slides on the angular face of plate 74 attached to supporting frame 75. The outer face 76 of wedge 72 engages the adjacent face of ball thrust bearing 77, and axial movement thus produced forces clutch disk 78 against the inner face of drum 42. While drum 42 is journalled on shaft 62 to freely turn, it is restrained by hub thimble 79 against axial movement. A friction disk 80 operating on the outer face 81 of drum 42 acts as a brake to keep a predetermined tension on cables 26 and 27.

When shaft 69 is turned counter-clockwise by crank 85, wedge 72 is drawn inward and engages the clutch disk against drum 42. The shaft 36 is rotated in a direction so that this drum winds up cables 26 and 27 and thus draws bridge beam 15 to the rear open end of bin 2. Meanwhile, cables 24 and 25 are unwound and payed out from drum 35. The construction, mounting, and operation of drum 35 is a left counterpart of that of drum 42. It has a drag friction disk 80a which keeps cables 24 and 25 taut.

Rotation of shaft 69 clockwise, and past the central neutral point actuates drum 35 and draws in cables 24 and 25, while cables 26 and 27 are payed out.

In use, various different feed substances are placed in the several bin compartments 11, 12, and 13, after partitions 6 and 7 and back walls 11, 12, and 13 have been adjusted to the proportions desired.

Motor 49 is then started and clutch handle 85 operated to draw the bridge 15 together with the back walls toward the front bin wall 4. Obviously, the bins are filled when the back walls are at the rear of the bin structure. Clutch 66 is operated to actuate drum 35 which draws the back walls 11, 12, and 13 forward as stated. At the same time, the mechanism above described turns shaft 55 and drives mixing and feeding screw 47 so as to force all feed substances passing through opening 45 toward the right end of casing 46, as shown in Figure 2. As the back walls advance the various feeds are forced into the casing 46, and tumbled and mixed by screw 47 and finally delivered through spout 82. Screw 47 is geared to turn at a rate which will convey these materials at a rate slightly faster than the rate at which the movement of the end walls forces this feed into the conveyer. Whenever sufficient feed has been mixed, motor 49 is stopped and the feeds all remain unmixed in the several compartments until operation is again resumed. When the bin compartments are empty, the bridge 15 and back walls 11, 12, and 13 are returned to the back end of bin 2 by reversing the operation of clutch 66. When this is done, drum 42 winds up cables 26 and 27, which pull the beam structure to the rear. During both operations, the brakes 80 and 80a keep the inoperative cables taut and thereby prevent them from snarling.

From the foregoing, it will be seen that we have produced a structure which is comparatively light and self-contained. That is, all operative mechanism can be secured to the front wall of the entire bin. Since feeds placed in the various bin compartments are not fed by gravity, the rate of feed depends entirely upon the rate of movement furnished by drum 35 and cables 24 and 25. Therefore, the weight of a cubic unit of any of the feeds does not control the rate of feed. Furthermore, since the bin compartments are not vertical, but are horizontal, the whole bin can be made comparatively flat and adapted to mounting upon a vehicle. Since the capacity of the bin is governed by its width, and the bin compartments are open at the top, it is easy to fill them from ordinary storage hoppers and elevating conveyers are not needed. In this respect, the advantages of this flat type of bin structure, over that of the vertical feed mixing bins, are obvious.

Whereas we have shown but one exemplary form of our device, it is to be understood that the exact structure shown is subject to modification and changes by substitution of equivalent parts.

Therefore, we wish to be limited only by the following claims, which should be afforded a broad interpretation.

We claim:

1. A feed mixer comprising a flat rectangular bin body having a closed bottom, vertical sides and a stationary end wall, and an open top and rear end; removable longitudinal partitions dividing said bin into parallel longitudinal compartments, tracks formed along the top edges of said bin sides, a transverse beam having end housings with supporting rollers operative along said tracks, movable end walls operative in said compartments rigidly supported in depending position from said beam; a screw conveyer having a screw increasing in diameter toward its delivery end and a conical case substantially conforming thereto with a slot fitting a delivery slot in said stationary end wall of said bin arranged to receive feed from said compartments; a pair of cables attached to the ends of said beam end housings, adjacent said stationary bin end, and wound on a drum operative through a clutch from a motor adapted to draw said beam and movable end walls toward said stationary bin end wall; a second pair of cables attached to the portions of said beam end housings opposite said bin end wall, operative over sheaves and wound on a drum driven through a clutch by a motor adapted to draw said beam and movable end walls away from said stationary bin end wall; and mechanism adapted to rotate said feed screw when said movable end walls are drawn toward said stationary bin end wall whereby feed in said several compartments is received by said screw conveyer, mixed, and ejected from its delivery end.

2. In a feed mixer as herein disclosed having a bin with a plurality of longitudinal end walls operative toward a stationary end wall, and a screw conveyer of expanding diameter toward its delivery end connected to said compartments to receive feed material therefrom as said movable end walls force it toward said stationary end wall, mechanism for operating said movable end walls and said conveyer, including a motor, a shaft driven therefrom at a predetermined reduced speed, two cable drums journalled on said shaft, a clutch mechanism disposed between said drums, mechanism for operating said clutch to connect either one of said drums to said driven shaft while the other drum is disconnected, friction means operative on said drums to maintain a continuous drag thereon, a pair of cables wound on one of said drums and operatively connected to said movable end walls to draw them toward said stationary end wall, a second pair of cables wound on the other drum in a direction opposite to the winding on said first mentioned drum and operatively connected to said movable end walls to draw them away from said stationary end wall; and mechanism connecting said driven shaft to said screw conveyer whereby it is operated therefrom.

DELMAR E. PAINTING.
FRED A. FARNBACH.

REFERENCES CITED

The following references are of record in the file of this patent:

UNITED STATES PATENTS

| Number | Name | Date |
| --- | --- | --- |
| 539,055 | Holthaus | May 14, 1895 |
| 1,477,586 | Patterson | Dec. 18, 1923 |
| 1,563,101 | Offenhauser | Nov. 24, 1925 |